United States Patent [19]
Sato et al.

[11] Patent Number: 5,504,296
[45] Date of Patent: Apr. 2, 1996

[54] METHOD OF HOT BRAZING ALUMINUM ARTICLES

[75] Inventors: Shoichi Sato; Ichiro Iwai; Yuichi Furukawa, all of Oyamashi, Japan

[73] Assignee: Showa Aluminum corporation, Osaka, Japan

[21] Appl. No.: 116,010

[22] Filed: Sep. 2, 1993

[30] Foreign Application Priority Data

Sep. 14, 1992 [JP] Japan .................. 4-245008

[51] Int. Cl.⁶ .................. B23K 1/00; B23K 35/22
[52] U.S. Cl. .................. 219/85.1; 148/24; 219/85.16; 219/615; 228/262.51
[58] Field of Search .................. 219/615, 616, 219/85.14, 85.15, 85.16, 85.22; 148/526, 527, 528, 535, 23, 24, 26; 228/207, 223, 224, 262.51

[56] References Cited

U.S. PATENT DOCUMENTS

| | | | |
|---|---|---|---|
| 3,235,704 | 2/1966 | Rockwell, Jr. | 219/85.14 |
| 3,496,324 | 2/1970 | Harper | 219/85.15 |
| 3,592,993 | 7/1971 | Bennett | 219/85.15 |
| 3,667,111 | 6/1972 | Chartet | 228/224 |
| 4,214,925 | 7/1980 | Arita et al. | 228/262.51 |
| 4,901,909 | 2/1990 | George | 228/224 |
| 4,981,526 | 1/1991 | Kudo et al. | 148/24 |
| 5,173,126 | 12/1992 | Ogura et al. | 148/23 |
| 5,226,974 | 7/1993 | Conn | 148/23 |

FOREIGN PATENT DOCUMENTS

| | | |
|---|---|---|
| 515196 | 2/1979 | Australia . |
| 0032355 | 7/1981 | European Pat. Off. . |
| 2109276 | 5/1972 | France ........................ 219/615 |
| 1117795 | 11/1961 | Germany .................. 219/85.16 |
| 1-192467 | 8/1989 | Japan ........................ 228/207 |
| 1-313188 | 12/1989 | Japan .................. 228/262.51 |
| 2133168 | 5/1990 | Japan ........................ 228/224 |
| 2027617 | 2/1980 | United Kingdom . |

OTHER PUBLICATIONS

E. Lugscheider et al. "Metallurgical Aspects Of Additive-Aided Wide-Clearance Brazing With Nickel-Based Filler Metals," *Welding Journal*, vol. 68, No. 1, Jan. 1989, Miami, FL, pp. 9S–13S.

*Primary Examiner*—Geoffrey S. Evans

[57] ABSTRACT

In a method of hot brazing aluminum articles, the steps of: interposing an amount of a flux-containing brazing agent (12) between portions of aluminum articles (11, 11) which are to be adjoined one to another; gripping the portions with a pair of heaters (13); and then activating the heater so that heat conducted therefrom melts the brazing agent (12) to braze the aluminum articles (11), are carried out in this order. The brazing agent (12) is a compacted agent composed of a matrix powder and a flux powder, at a ratio in weight of 99.9:0.1 to 70:30, and the agent has a density corresponding to 90% or more of a theoretical value. The articles (11) may be pressed one to another towards adjoining surfaces while they are being heated by the heater (13), or the heaters (13) are slided relative to the adjoining portions so that they are heated wholly, or the adjoining articles (11, 11) are urged towards each other while the heaters (13) are being slided relative to them so as to entirely heat them, so that the brazing is carried out efficiently to manufacture brazed products which are of a higher brazing strength.

11 Claims, 4 Drawing Sheets

METHOD OF HOT BRAZING ALUMINUM ARTICLES

TECHNICAL FIELD OF THE INVENTION

The present invention relates to a method of hot brazing aluminum articles, and more particularly to a method adapted for the brazing of portions of the aluminum articles.

The term 'aluminum' used in this specification does include aluminum and its alloys.

BACKGROUND ART

Heretofore, the resistance spot brazing has widely and generally been employed to braze the aluminum article portions one to another. In this method, electrodes made of copper or the like are set in contact with the portions which are to be brazed, and an electric current is supplied through said portions which are pressed to each other. Resistance heat which the current generates is utilized to raise the temperature of the article portions to be brazed. Further, the so-called torch brazing and high-frequency brazing are also practiced.

It is however noted that the intrinsic electrical resistance of aluminum is considerably low and the heat conductivity of aluminum is so high that only a limited amount of heat is generated by the electric current. Therefore, a heavy current for example 20 to 30 kA is needed for each spot to produce a sufficient amount of heat for the brazing, thereby raising its energy cost. In addition, an alloy of copper and aluminum will inevitably be produced at the tip ends of electrodes. Such an alloy causes the dressing of said electrodes to be done frequently, resulting in an earlier wear and tear of the electrodes and a lower productivity of the brazing. Due to the abraded electrodes and the variable surface state of the aluminum articles, the brazed strength thereof is likely to vary between the brazed products, thus impairing their reliability in quality. It is another problem that material consumption increases because of broader regions of the articles overlapped one on another for a higher current density.

In the torch brazing or the high-frequency brazing of large articles, it has been extremely difficult to heat and simultaneously press their portions to be brazed, due to their great dimension. Thus, they cannot be adjoined one to another, or their brazed strength varies beyond a permissible range even if the brazing itself is possible. The poor heat efficiency in these brazing methods has particularly rendered it difficult to braze those materials which are made of an alloy of aluminum and magnesium.

The present invention was made to resolve such problems as mentioned above, and therefore an object of the invention is to provide a novel method of hot brazing the aluminum articles not only efficiently in general but also effectively in the partial adjoining of large-sized articles, without failing to ensure their brazed strength.

DISCLOSURE OF THE INVENTION

The hot brazing method proposed herein to achieve this object characteristically and basically comprises the steps of interposing an amount of a flux-containing brazing agent (12) between portions of aluminum articles (11) which are to be adjoined one to another, bringing at least one heater (13) into contact with one of the aluminum articles, and then activating the heater so that heat conducted therefrom melts the flux-containing brazing agent (12) to braze the aluminum articles (11).

The flux-containing brazing agent (12) may preferably be a compacted agent composed of a matrix powder and a flux powder blended therewith at a ratio in weight of 99.9:0.1 to 70:30, and the agent may preferably have a density corresponding to 90% or more of a theoretical value.

Alternatively, a pair of the heaters (13) may be employed so that the aluminum article portions are sandwiched between them.

It may be preferable that the articles (11) are pressed one to another towards adjoining surfaces thereof at the same time as they are heated. It also is desirable to cause the heater or heaters (13) to slide relative to the adjoining portions so that they are heated wholly. It may be more preferable that during the heating step the adjoining articles are urged towards each other, and the heaters (13) are caused to slide relative to them so as to entirely heat them.

The heaters (13) may be those which themselves generate heat, those which are heated by a high-frequency induction source, or heat conductors receiving heat from an external source.

The aluminum articles (11) to which the method of the invention is applied may be of any desired chemical composition.

The matrix as a primary ingredient of the flux-containing brazing agent (12) is an aluminum alloy whose melting point is lower than that of the brazed articles (11). Chemical composition and shape or physical state of said agent are not restricted within narrow limits insofar as it contains the flux. Therefore, the matrix constituting the agent (12) may be any appropriate one of aluminum alloys, which have been and are widely used as the conventional brazing agent, and which contains one or more elements such as Si and Zn which are effective to lower the melting point of the alloy. The alloy may further contain some additional elements to improve the characteristics of the brazing agent. Thus, the composition of such a matrix, which may be the alloy or a mixture of elements, may be designed to match the property of the brazed articles (11). Since the melting point of the agent must ensure in any case a satisfactory brazing of the articles, 3–15% by weight of Si must be contained if the matrix is an alloy of aluminum and silicon. With regard to the flux, it may be any fluoride flux or any chloride flux which may be selected in consideration of the type or kind of the brazed articles (11) and the sort of the matrix.

The flux-containing brazing agent (12) may be for example such a solid piece as will be detailed later, or a colloid or suspension prepared by mixing a matrix powder and flux powder with a liquid binder. Accordingly, the solid agent (12) will be a molded sheet adapted for insertion between the surfaces which are to be adjoined, whereas the colloidal agent (12) will be painted onto said surfaces.

Although the present method is feasible and applicable whether the flux-containing brazing agent (12) is solid or colloidal, it had better be solid for convenient handling of this brazing agent. A preferable example of the solid agent is a compacted rigid piece which may be prepared by compressing the matrix powder together with the flux powder, at a ratio of the former to the latter falling within a range of 99.9:0.1 to 70:30. The apparent density representing a compacted degree of this rigid piece is desirably 90% or more of theoretical value. The compacted piece may subsequently be subjected to an appropriate forming process such as extrusion or rolling to give the flux-containing brazing agent (12) of any desired shape.

In a case wherein the flux-containing solid brazing agent is used, the fluoride or chloride flux powder will be blended with the matrix powder, which is either a powder of an aluminum alloy containing Si, Zn or the like element, or a mixed powder of the elements as mentioned above. The blend ratio in weight of the matrix to the flux is desirably from 99.9:0.1 to 70:30, also as already described. This is because a lesser content of flux below the ratio of 99.9:0.1 will render the fluxing property of the brazing agent too poor to ensure a good brazing. An excessive amount of flux above the ratio of 70:30 is also harmful because any additional fluxing effect is not obtained but such a relatively reduced amount of the matrix as the principal ingredient of the flux-containing brazing agent will impair its brazing effect.

The solid brazing agent containing the flux may be prepared generally by mixing a matrix powder with a flux powder and then compacting the mixture thus obtained in a hot press or the like. The matrix powder is either a mixture of Al powder, Si powder, Zn powder and the like or an alloy powder of a given composition. The apparent density of the compacted brazing agent is lower than a theoretical value which the densities of employed raw powders will give. Such a difference results from a considerable amount of air remaining within the piece. It is important herein that the apparent density of the brazing agent is 90% or more of the theoretical value. If contrarily its apparent density is below 90% of said value, then it is likely that internal pores intercommunicate with each other to render the piece brittle and fragile and disable the secondary forming of them into a shape adapted for the brazed aluminum articles. Thus, it is more desirable that the apparent density of said agent be 95% or more of the theoretical value. In order to ensure a uniform mixing of the powders and a denser internal structure of the brazing agent, the raw powders have to be previously pulverized as fine and minute as possible. Therefore, preferable upper limits for average particle size of those powders are for example not more than 44 μm for Al powder, not more than 5 μm for Si powder and not more than 30 μm for flux powder.

A variety of layout modes are applicable to the present method, as will be detailed below. The materials and members which will be involved and arranged are: the articles (11) having their surfaces to be adjoined one to another; the flux-containing brazing agent (12) which intervenes between them and brazes them; and at least one heater (13) disposed on one side of the surfaces while they are being adjoined. Although the adjoining surfaces are sandwiched between a pair of the heaters (13) in the illustrated layout modes, the brazing can be effected using only one heater (13) on one side of the adjoining surfaces.

In a first layout mode shown in FIG. 1B, the articles (11) to be brazed are two sheets overlaid one on another, and the flux-containing brazing agent (12) is interposed between the surfaces of the articles which face one another to be brazed. The pair of the heaters (13) are located to sandwich the articles (11), extend in parallel with the surfaces thereof and press them towards their surfaces which are to be brazed.

In a second layout mode shown in FIG. 2, the articles (11) are two sheets which each have a main surface and an end surface extending therefrom. Those end surfaces abut against each other, also with the flux-containing brazing agent (12) being interposed between them in an adjoining region. The pair of the heaters (13) are located such that each bridges the adjoining region and extends perpendicular thereto. Preferably, each heater (13) has a cutout (13a) which protects the heater from directly contacting the brazing agent (12), because the heater spoiled with the agent would render unsatisfactory the brazing operation.

Also preferably, the abutting and adjoining surfaces of the articles (11) are pressed one to another simultaneously with the heating by the heaters (13). A means for effecting such a pressing in the first layout mode shown in FIG. 1B may be a device or mechanism which urges one of the heater (13) towards the other, or urges both the heaters towards each other. Since it is difficult for the heaters in the second layout mode shown in FIG. 2 to function as one of the pressing means, additional tools may be employed to press the articles (13) towards each other as indicated by the arrows.

The present method can also be applied to a certain case wherein the adjoining portions to be brazed are larger than the heaters (13), if the heaters are driven to slide on and along the adjoining ear portions. In detail, a pair of roller-shaped heaters (13') may be used for that purpose in a manner shown in FIGS. 3A and 3B. Those heaters (13') will grip the mutually overlying lateral sides of the sheet-shaped articles (11) between which the flux-containing brazing agent (12) intervenes, and will rotate about its own axis to be displaced along the sides. Any plane articles of a large surface area can continuously be brazed in this manner. In a case of FIG. 4 wherein the side ends of the articles (11) abut against each other, the pair of roller-shaped heaters (13') will be driven to rotate while being displaced, thus enabling large-sized articles to be brazed. A cutout (13'a) may preferably be formed around the heater (13'), similarly to the case shown in FIG. 2.

Alternatively, in the cases shown in FIGS. 3A to 4, the pair of the heaters (13') may not be displaced but only be allowed to rotate about their own axes, with the adjoining articles (11) being driven to move toward or away from the heaters so as to 'slide' relative thereto.

In addition to such a relative displacement of the heaters (13'), a pressure towards the adjoining surfaces may be applied to the articles. For example, a pinching force may be imparted to either of or both the rotating heaters (13') in the arrangement shown in FIGS. 3A and 3B. In the case shown in FIG. 4, an urging force may be applied to one of or both the heaters (13') in the direction perpendicular to the displacement thereof.

Even if the heaters (13) are displaced as shown in FIGS. 3A and 3B or in FIG. 4, they need not be rollers (13') illustrated therein, but other heaters (13) having a substantially rectangular cross section can be used and moved successively along the adjoining portions of the articles.

The type of the heaters (13) is not restricted to any particular one including a carbon heater or other electric heaters which themselves generate heat as in FIG. 1B, but may be any indirect heater which is activated by a high-frequency induction apparatus or any other type of external heat source. In a further case, the high-frequency induction heating will be employed as shown in FIG. 5A. An electric conductor (14) will be kept in contact with each adjoining article portion to be brazed, and a high-frequency induction coil (15) will be fitted on or disposed near the conductor. An eddy current will be generated in this way and utilized to heat the conductor (14). In another case wherein the other external heat source is used as shown in FIG. 5B, a highly heat conductive member (16) contacts the adjoining portion. An external heat source (17), e.g., an infrared oven or a proper burner, may be arranged adjacent to the conductive member (16) so that its heat is transmitted via this member to the portion to be brazed. In an arrangement shown in FIGS. 3A to 4 wherein the heaters (13') will be displaced relative to the brazed portions, the external heat sources are driven in unison with the heaters. If the articles are heated and pressed in one and the same direction as is the case of first layout mode (shown in FIG. 1B), then suitable pressing tools may be connected to a pneumatic cylinder or the like. The tools will not only grip said adjoining portions of the articles (11), but also serve as the electric conductors (14) or heat conductive members (16) cooperating with the external heat source. Since materials made of aluminum are highly heat conductive, the heaters (13) can be operated at a temperature which is slightly higher than the melting point of the brazing agent (12) in order to melt it smooth and rapidly. Thus, the brazing process can be finished within only 10 (ten) seconds.

In operation, the flux-containing brazing agent is set in place between the article surfaces of the adjoining portions which have to become integral with each other, and the adjoining portions are sandwiched between the pair of heaters so that heat which is conducted through the articles does melt the brazing agent. As the flux-containing composite agent whose matrix is any ordinary brazing agent is molten, the flux contained therein will also melt to be supplied together with the matrix to the adjoining portions. Therefore, any oxide layer present on the article surfaces will be eliminated whereby the brazing agent can closely and completely adhere to said surfaces, thus enabling the brazing operation to be done in air.

The flux-containing brazing agent in the form of a solid piece will render simpler the brazing operation because the portions to be adjoined are easily supplied with the brazing agent.

The pressing, simultaneously with the heating, of the articles towards their surfaces to be brazed will cause the fused brazing agent to come into a closer contact with the adjoining articles. Consequently, the brazing strength will be raised and the length of time to braze the articles will be shortened. In a prticular case wherein the adjoining portions are sandwiched between the pair of activated heaters, the flux-containing brazing agent will be fused more quickly to further shorten the brazing time.

The heater or the pair of heaters sliding relative the adjoining article portions will enable any large-sized portions to be brazed one to another by means of relatively small-sized heater or heaters.

The pressing of the articles towards their adjoining surfaces, simultaneously with the relative sliding of the heaters, will be effective to raise the brazing strength shorten the brazing time, even if the heaters are small compared with the adjoining article portions.

The heater or heaters may be of the direct heating type or of the indirect type such as those which are activated by the high-frequency induction source or other external apparatus. The most appropriate one will be selected taking into account the shape or size of the adjoining portions, and in view of whether the pressing of said portions is or is not carried out, and whether the heaters are or are not slided along said portions.

A high strength of adjoined portions is thus enhanced to the brazed articles. An adjoined area can easily be increased or decreased by changing the areas between which the flux-containing brazing agent is interposed, by changing the cross-sectional area of the heaters, and/or by changing the pressed areas.

In summary, the hot brazing method of the invention affords an excellent brazing strength, in spite of the quicker and simpler brazing operation. In particular, the adjoined areas of the particles, which areas can be made larger than that in the prior art resistance spot brazing technique readily by a larger surface of brazing agent, a larger cross section of the heaters and/or the sliding displacement of heaters or adjoining articles, will further contribute to the excellent brazing strength. In the case wherein the heaters press the articles towards their surfaces to be brazed, both the heat and pressure are given to said surfaces so that any desired portions of large-sized articles can be brazed tightly and rigidly.

In addition to the advantages mentioned above, energy consumption of the brazing process is reduced herein to a remarkable extent. This is because the heat conductivity of aluminum articles is so high and the process can be finished quicker compared with the conventional methods conducted in air, thus enabling a satisfactory brazing of Al-Mg alloy articles.

DETAILED DESCRIPTION OF THE PREFERRED EMBODIMENTS

Figure 1A:
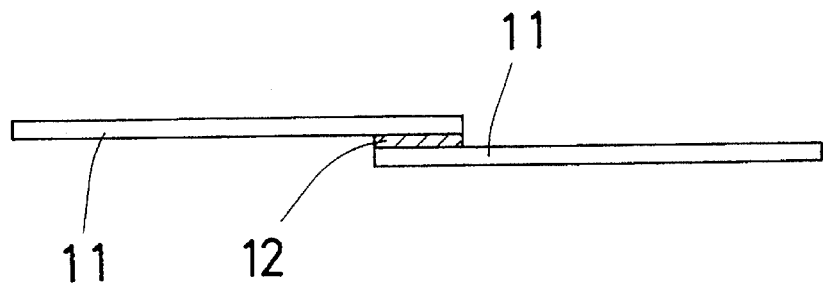
FIG. 1A is a cross-sectional view schematically illustrating sheet-shaped articles which have their ears overlying one another, with a piece or paste of a flux-containing brazing agent being interposed between them, according to a first layout mode in a first embodiment of the present invention.

Now, the preferred embodiments of this invention, i.e., a method of hot brazing aluminum article, will be described referring to the drawings.

First Embodiment

Sheets of an alloy 'JISA6N01-T5' were used in this embodiment, wherein each sheet was 15 mm wide, 100 mm long and 1.0 mm thick. A flux-containing brazing agent used in this embodiment was a mixture of a matrix powder and a fluoride flux powder, and the matrix powder was an aluminum alloy containing 10% by weight of Si. The fluoride flux was a powder of an eutectic mixture which comprises 45.8% of KF and 54.2% of $AlF_3$, and 10 parts by weight of the fluoride flux was blended with 90 parts by weight ratio of the matrix. This powder mixture was hot compacted and then extruded to give rigid pieces each being 15 mm wide, 10 mm long and 0.7 mm thick.

Figure 1B:
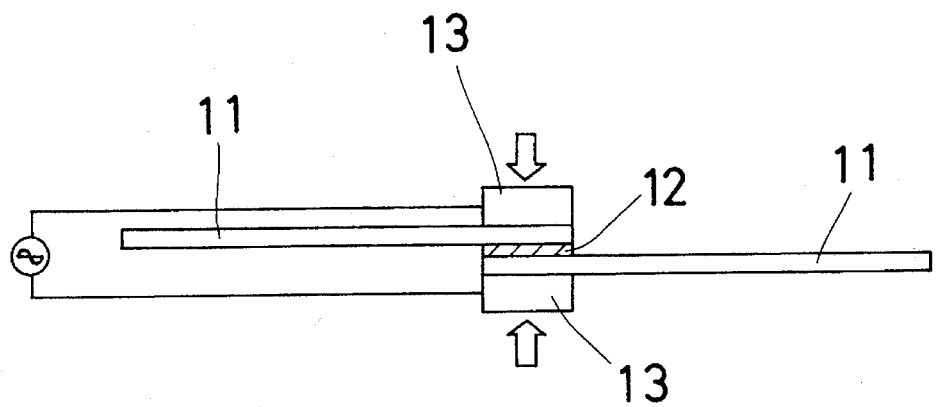
FIG. 1B is also a cross-sectional view showing the articles and the brazing agent, which are sandwiched between a pair of carbon heaters.
Figure 2:
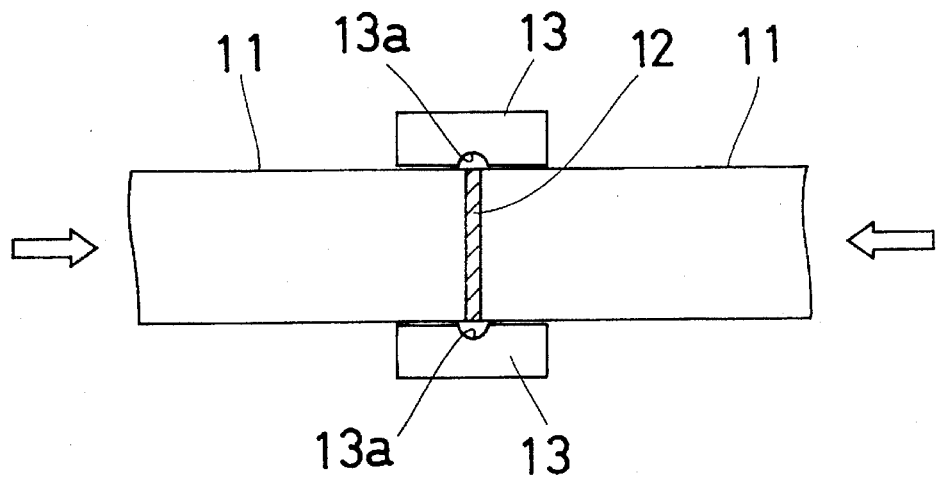
FIG. 2 is a cross-sectional view illustrating a second layout mode in the invention.

Two sheets 11 and 11 were arranged to overlap each other at their ears of a width of 10 mm, with the piece 12 of the flux-containing brazing agent being interposed between the ears in a manner shown in FIG. 1A. Then, as shown in FIG. 1B, a pair of carbon heaters 13 were set in place to grip the overlapping ears. Those heaters were such that heat was generated due to an electric current flowing through the heaters. A pneumatic cylinder (not shown) was activated to press the heaters towards each other as indicated by the arrows in FIG. 1B. The heat generated by the carbon heaters 13 was transmitted via the ears of the sheets 11 to the piece 12 of the flux-containing brazing agent. This brazing agent thus molten brazed the sheets one to another. Five samples were prepared using such an apparatus as described, each sample being brazed at a heater temperature of 700° C. at a pressure of 20 kg/cm$^2$ and for 5 seconds. Those brazed samples were then subjected to a tensile test wherein each of them was stretched till breakage thereof. The breaking strength of 180–190 kgf thus obtained for each sample was rated as an excellent brazing strength.

Second Embodiment

Sheets of the alloy 'JISA6N01-T5' were used also in this embodiment, wherein each sheet was 100 mm wide, 500 mm long and 1.0 mm thick. A flux-containing brazing agent used in this embodiment was of the same composition as that in the first embodiment, and extruded to give rigid pieces each being 10 mm wide, 500 mm long and 0.7 mm thick.

Figure 3A:
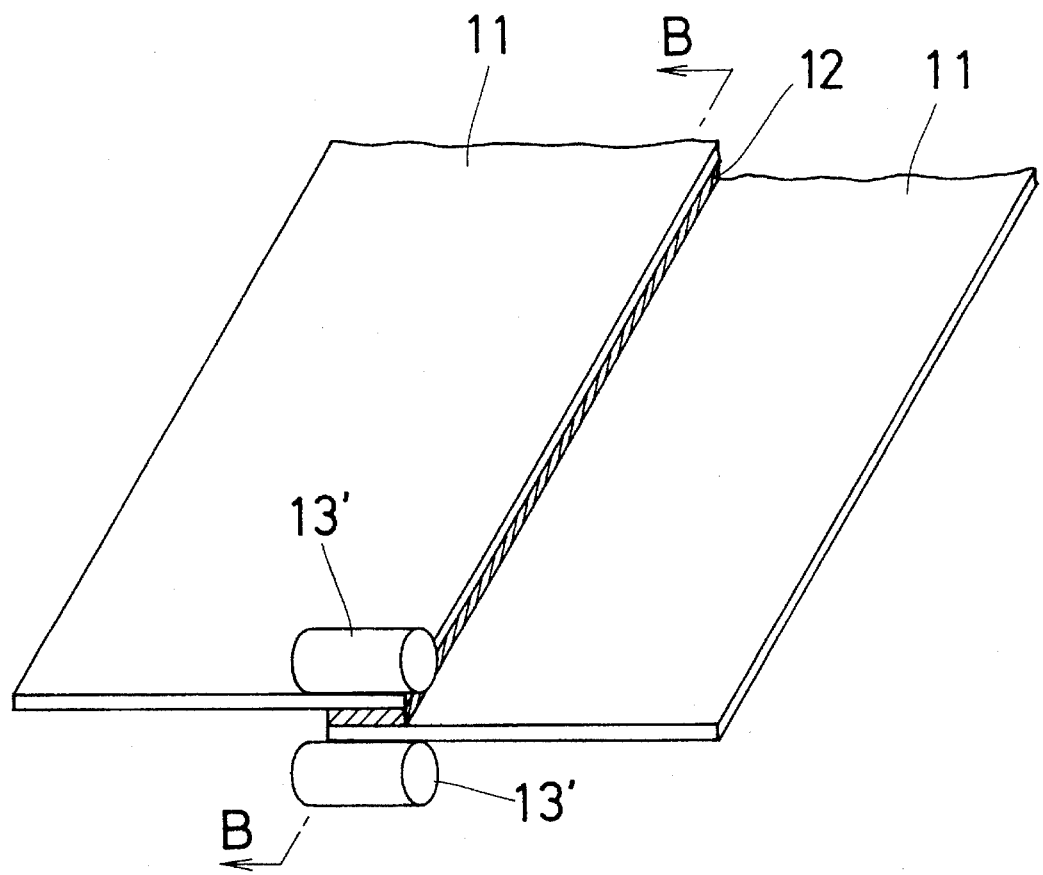
FIG. 3A is a perspective view schematically showing a modification of the first layout mode and a second embodiment of the invention.
Figure 3B:
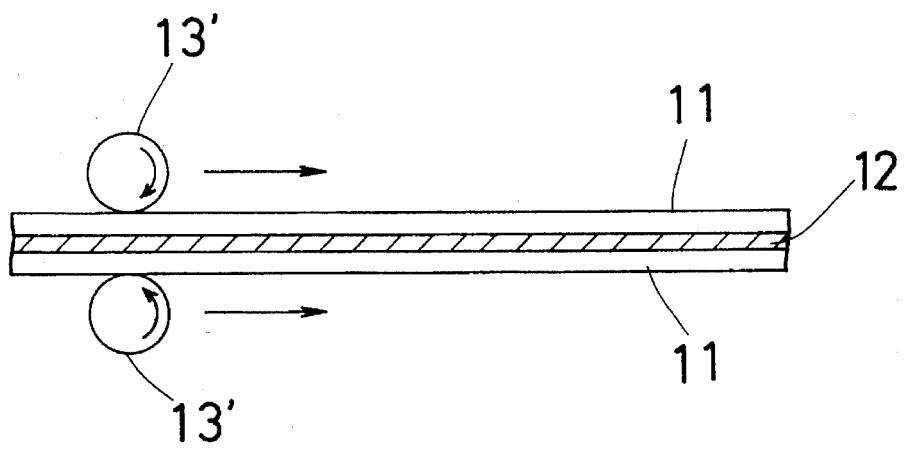
FIG. 3B is a cross section taken along the line B—B in FIG. 3A.
Figure 4:
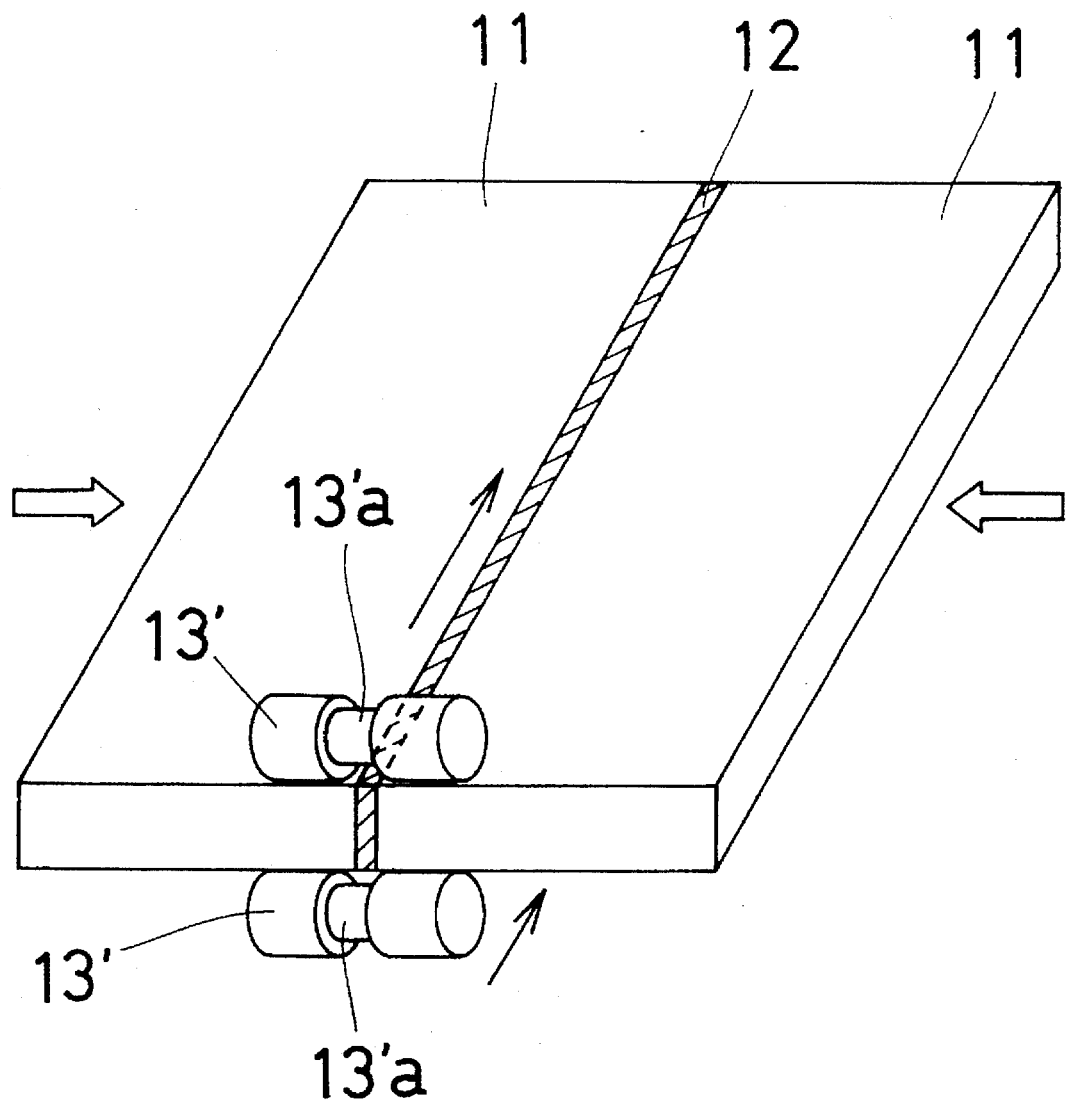
FIG. 4 is a perspective view schematically showing a modification of the second layout mode.
Figure 5A:
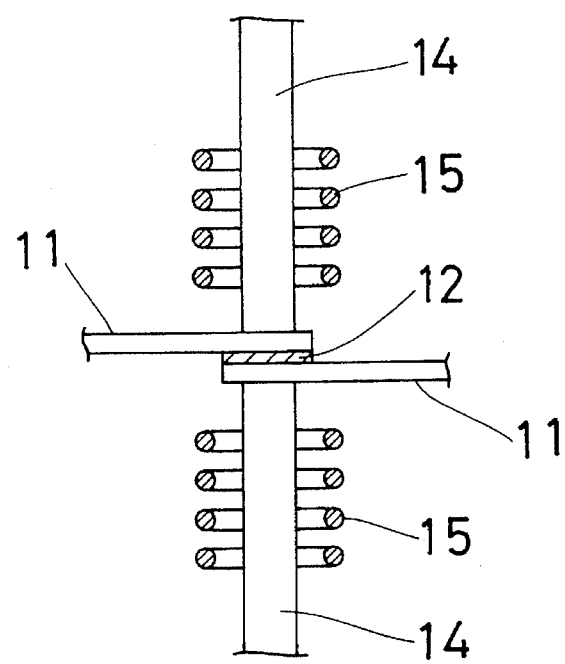
FIGS. 5A and 5B are cross-sectional views schematically showing two further modifications of the first layout mode.
Figure 5B:
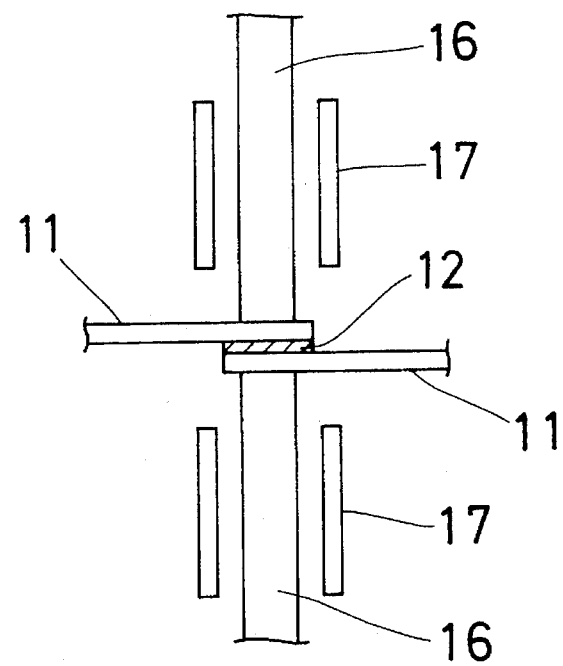

Two sheets 11 and 11 were likewise arranged to overlap each other at their ears of a width of 10 mm, with the piece 12 of the flux-containing brazing agent being interposed between the ears in a manner shown in FIG. 3A. Then, as shown in FIGS. 3A and 3B, a pair of carbon heaters 13' were set in place to grip the overlapping ears. Those heaters 13', which were initially disposed at one lateral ends of the overlapping ears, comprised rollers having a width slightly larger than the width of said ears. The heaters 13' were then pressed towards the adjoining portions of the sheets, and were allowed to rotate and slidingly move towards the other lateral ends of the ears so as to carry out the brazing process. Five samples, which had been brazed in this apparatus at a heater temperature of 700° C., at a pressure of 20 kg/cm$^2$ and at a slide speed of 0.1 cm/sec, were subjected to the tensile test. Each of their breaking strength thus measured was in a range of 6000–6200 kgf rated as an excellent brazing strength.

What is claimed is:

1. A method of hot brazing aluminum articles, the method comprising the steps of: interposing an amount of a flux-containing brazing agent (12) composed of a brazing agent and a flux between portions of aluminum articles (11, 11) which are to be adjoined one to another, wherein the brazing agent is a compacted agent composed of a matrix powder and a flux powder blended therewith at a ratio in weight of 99.9:0.1 to 70:30, and the agent has a density corresponding to 90% or more of a theoretical value; bringing at least one heater (13) into contact with at least one of the aluminum articles; and then activating the at least one heater so that heat conducted therefrom melts the flux-containing brazing agent (12) to braze the aluminum articles one to another.

2. The method as defined in claim 1, wherein the articles (11, 11) are urged towards their adjoining surfaces while they are being heated by the at least one heater (13).

3. The method as defined in claim 1, wherein the at least one heater (13) is slid relative to the adjoining portions so that they are heated wholly.

4. The method as defined in claim 1, wherein the adjoining articles (11, 11) are urged towards each other, and the at least one heater (13) is caused to slide relative to the article so as to entirely heat the articles.

5. The method as defined in claim 1, wherein the at least one heater is a pair of heaters (13) which sandwich between them the aluminum article portions.

6. The method as defined in claim 5, wherein the articles (11, 11) are urged towards their adjoining surfaces while they are being heated by the heaters (13).

7. The method as defined in claim 5, wherein the heaters (13) are slid relative to the adjoining portions so that they are heated wholly.

8. The method as defined in claim 5, wherein the adjoining articles (11, 11) are urged towards each other, and the heaters (13) are cause to slide relative to the article so as to entirely heat the articles.

9. The method of claim 1, wherein the at least one heater (13) themselves generate heat.

10. The method of claim 1, wherein the at least one heater (13) are heated by a high-frequency induction source.

11. The method of claim 1, wherein the at least one heater (13) are heat conductors receiving heat from an external source.

* * * * *